United States Patent
Gyenge (10) Patent No.: US 10,854,906 B2
(45) Date of Patent: Dec. 1, 2020

(54) REDOX FLOW BATTERY WITH CARBON DIOXIDE BASED REDOX COUPLE

(71) Applicant: Agora Energy Technologies Ltd., Vancouver (CA)

(72) Inventor: Elod Lajos Gyenge, Vancouver (CA)

(73) Assignee: AGORA ENERGY TECHNOLOGIES LTD., Vancouver (CA)

( * ) Notice: Subject to any disclaimer, the term of this patent is extended or adjusted under 35 U.S.C. 154(b) by 267 days.

(21) Appl. No.: 15/741,106

(22) PCT Filed: Jun. 30, 2016

(86) PCT No.: PCT/CA2016/050770
§ 371 (c)(1),
(2) Date: Dec. 29, 2017

(87) PCT Pub. No.: WO2017/004705
PCT Pub. Date: Jan. 12, 2017

(65) Prior Publication Data
US 2018/0219240 A1    Aug. 2, 2018

Related U.S. Application Data

(60) Provisional application No. 62/190,135, filed on Jul. 8, 2015.

(51) Int. Cl.
H01M 8/18    (2006.01)
H01M 8/20    (2006.01)
H01M 4/86    (2006.01)

(52) U.S. Cl.
CPC ......... H01M 8/188 (2013.01); H01M 4/8615 (2013.01); H01M 8/20 (2013.01); Y02E 60/50 (2013.01)

(58) Field of Classification Search
CPC .. H01M 4/8605; H01M 4/8615; H01M 4/921; H01M 8/188; H01M 8/20; H01M 2300/0002; H01M 2300/0014; Y02E 60/528
See application file for complete search history.

(56) References Cited

U.S. PATENT DOCUMENTS

| | | | |
|---|---|---|---|
| 4,673,473 A | 6/1987 | Ang et al. | |
| 5,928,806 A | 7/1999 | Olah et al. | |
| 7,045,238 B2 | 5/2006 | Gottmann et al. | |
| 7,364,810 B2 | 4/2008 | Sridhar et al. | |
| 2005/0175880 A1* | 8/2005 | Cho | C08J 5/2281 429/494 |
| 2008/0096077 A1* | 4/2008 | Oomichi | H01M 4/8605 429/467 |
| 2008/0223727 A1* | 9/2008 | Oloman | C25B 15/08 205/413 |
| 2008/0254326 A1* | 10/2008 | Borgstrom | F03D 9/25 429/443 |
| 2013/0180863 A1* | 7/2013 | Kaczur | C25B 11/0478 205/349 |
| 2014/0057139 A1 | 2/2014 | O'Connor et al. | |
| 2014/0206894 A1* | 7/2014 | Cole | C07C 29/58 560/204 |

FOREIGN PATENT DOCUMENTS

| | | |
|---|---|---|
| CN | 101268217 | 9/2008 |
| CN | 101657568 | 2/2010 |
| CN | 103503215 | 1/2014 |
| CN | 104619886 | 5/2015 |
| EP | 2876712 | 5/2015 |

OTHER PUBLICATIONS

Reda, T., Plugge, C.M., Abram, N.J., Hirst, J.—Reversible interconversion of carbon dioxide and formate by an electroactive enzyme, PNAS, vol. 105, No. 31, pp. 10654-10658, Aug. 5, 2008 (Year: 2008).*
Jiang, J., Wieckowski, A.—Prospective direct formate fuel cell, Electrochemistry Communications, 18 (2012), pp. 41-43 (Year: 2012).*
International Search Report and Written Opinion, dated Aug. 10, 2016, received in PCT/CA2016/050770.
Extended Search Report, dated Mar. 28, 2019, received in European Application No. 16 820 596.1.
First Office Action, dated Aug. 6, 2020, received in Chinese Application No. 201680040036.X.

* cited by examiner

*Primary Examiner* — Anca Eoff
(74) *Attorney, Agent, or Firm* — Davis Wright Tremaine LLP; Heather M. Colburn (57) ABSTRACT

A redox flow battery where the negative electrode uses carbon dioxide based redox couples. The negative electrode contains a bifunctional catalyst that allows for the reduction of carbon dioxide to carbonaceous species (e.g., formic acid, oxalic acid or their salts) in the battery charge (i.e., energy storage) mode, and for the oxidation of the above-mentioned carbonaceous species in the battery discharge (i.e., energy generation) mode. The positive electrode of the battery can utilize a variety of redox couples including but not restricted to bromine-bromide, chlorine-chloride, vanadium (IV)-vanadium (V), chromium (III)-dichromate (VII), cerium (III)-cerium (IV), oxygen-water (or hydroxide).

33 Claims, 5 Drawing Sheets

REDOX FLOW BATTERY WITH CARBON DIOXIDE BASED REDOX COUPLE

CROSS-REFERENCE TO RELATED APPLICATIONS

The present application is a U.S. National Stage entry under 35 U.S.C. § 371 of International Application No. PCT/CA2016/050770, filed on Jun. 30, 2016, designating the United States of America and published in English on Jan. 12, 2017, which claims the benefit of U.S. Provisional Application No. 62/190,135, filed on Jul. 8, 2015, each of which is hereby incorporated by reference in its entirety.

FIELD

The present disclosure relates generally to a redox flow battery that includes a carbon dioxide ($CO_2$) based redox couple.

BACKGROUND

Redox flow batteries are electrochemical devices that use a continuous flow of reactants at one or both electrodes of the cell. The reactant species shuttle between high and low oxidation states as required by the battery charge and discharge electrode reactions. Three defining features of redox flow batteries are: i) recirculation of the reactant species in the same cell for either oxidation or reduction at the electrodes, ii) electrochemical reversibility of the electrode reactions and iii) storage of the redox species outside the cell when the cell is not in operation. Prior art literature describes a variety of redox chemistries that have been investigated for redox flow batteries. Some known redox couple examples include: vanadium-vanadium, iron-chromium, vanadium-bromine, zinc-bromine, and zinc-cerium. It is also known for redox reactants to be dissolved in aqueous electrolytes (acid or alkaline solutions) with adequate ionic conductivity for the operation of the cell; see for example, A. Z. Weber, M. M. Mench, J. Meyers, P. N. Ross, J. T. Gostick, Q. Liu, J. Appl. Electrochem. 41 (2011) 1137-1164.

While the general concepts related to redox flow batteries are known in the art, improvements can be made in the chemistry and design of such batteries for various applications, including providing energy storage and generation capability in electricity grids that have intermittent energy generation sources such as solar, wind and other clean energy sources. Redox flow batteries are advantageous for large scale (e.g., grid level) energy generation and storage, and in particular can provide load leveling, which is especially important for alternative energy sources that generate power intermittently.

SUMMARY

According to one aspect of the invention, there is provided a redox or rechargeable flow battery that comprises a negative electrode, a positive electrode, and an ion conducting separator. The negative electrode comprises a carbon dioxide based redox couple and a bi-functional catalyst selected to reduce carbon dioxide to a carbonaceous derivative in an energy storage cycle and to oxidize the carbonaceous derivative to carbon dioxide in an energy generation cycle. The ion conducting separator is positioned to conduct ions between the negative and positive electrodes and to separate a negative electrode reactant at the negative electrode from a positive electrode reactant at the positive electrode.

The redox couple can be carbon dioxide-formic acid in which case the carbonaceous derivative is formic acid. The negative electrode bi-functional catalyst is selected to reduce $CO_2$ during battery charging and to oxidize the formic acid during battery discharge. In one alternative, the redox couple can be carbon dioxide-formate salt, in which case the carbonaceous derivative can be any one of: lithium formate, sodium formate; potassium formate, and cesium formate. The negative electrode bi-functional catalyst is selected to reduce $CO_2$ and to oxidize the formate salt (lithium, sodium, potassium or cesium). In another alternative, the redox couple can be carbon dioxide-oxalate salt, in which case the carbonaceous derivative can be any one of: lithium oxalate, sodium oxalate, potassium oxalate, and cesium oxalate. In this alternative, the negative electrode bi-functional catalyst is selected to reduce $CO_2$ and to oxidize the oxalate salt (lithium, sodium, potassium or cesium).

The positive electrode can comprise a bromine-bromide redox couple and a bi-functional catalyst selected to reduce bromine and to oxidize bromide. In one alternative, the positive electrode can comprise a chlorine-chloride redox couple and a bi-functional catalyst selected to reduce chlorine and to oxidize chloride. In another alternative, the positive electrode can comprise an iodine-iodide (polyiodide) redox couple and a bi-functional catalyst selected to reduce an oxidant and oxidize a reductant of the iodine-iodide (polyiodide) redox couple. In yet another alternative, the positive electrode can comprise a vanadium (IV)-vanadium (V) redox couple and a bi-functional catalyst selected to reduce vanadium (V) and oxidize vanadium (IV). In yet another alternative, the positive electrode can comprise a chromium (III)-dichromate (VI) redox couple and a bi-functional catalyst selected to reduce dichromate (VI) and oxidize chromium (III). In yet another alternative, the positive electrode can comprise a cerium (III)-cerium (IV) redox couple and a bi-functional catalyst selected to reduce cerium (IV) and oxidize cerium (III). Alternatively, the positive electrode can be a bi-functional oxygen electrode comprising a bi-functional catalyst that is selected to oxidize water or hydroxide and to reduce oxygen For all the cases presented above, the bi-functional catalyst for the negative electrode (i.e., the one that uses $CO_2$/carbonaceous derivative) can be any, but not limited to, one of: palladium or binary palladium-tin catalyst, a ternary palladium-tin-indium catalyst, a ternary palladium-lead-tin catalyst, a quaternary palladium-lead-tin-indium catalyst; and an osmium or osmium-alloy catalyst. Those skilled in the art will recognize that many negative electrode catalyst options may exist in addition to those listed above, including diverse metals, alloys, core-shell nanoparticles, organometallic catalysts, bioenzymatic catalysts, etc.

From an electrochemical engineering design point of view, those skilled in the art will recognize that the negative electrode can be any one of: a gas diffusion type electrode, a metal organic framework type electrode, a trickle-bed type electrode, a catalyst-coated membrane type electrode, and a particulate bed electrode (either packed or fluidized bed).

The ion conducting separator can be any one of: a proton exchange polymer membrane, a proton conducting ceramic membrane, a cation exchange membrane, a cation conducting ceramic membrane, and an anion exchange membrane. The ion conducting separator can also be a porous material containing in the pores a liquid alkaline electrolyte, or a liquid acidic electrolyte.

BRIEF DESCRIPTION OF DRAWINGS

FIGS. 2(a) and (b) are schematic illustrations of a $CO_2$-formate salt (sodium or potassium formate) redox flow battery according to a second embodiment, wherein the redox flow battery is shown operating in a battery charge mode in FIG. 2(a) and is shown operating in a battery discharge mode in FIG. 2(b).

DETAILED DESCRIPTION OF EMBODIMENTS

The embodiments described herein relate generally to a redox flow battery in the field of electrochemical energy generation and storage. The redox flow battery comprises a negative electrode which includes a carbon dioxide based redox couple, a positive electrode, and an ion conducting separator in between the negative and positive electrodes. The negative electrode also comprises a bi-functional catalyst that allows for the reduction of carbon dioxide to a carbonaceous species (e.g., formic acid, oxalic acid or their salts) in a battery charge (i.e., energy storage) cycle, and for the oxidation of the above-mentioned carbonaceous species in a battery discharge (i.e., energy generation) cycle in the same device. The positive electrode can utilize a variety of redox couples selected such that the equilibrium battery cell voltage, defined as the positive electrode equilibrium potential minus the negative electrode equilibrium potential, to be a positive value. Some examples of positive electrodes include bromine-bromide, chlorine-chloride, vanadium (V)-vanadium (IV), dichromate (VII)-chromium (III), cerium (IV)-cerium (III), oxygen-water (or hydroxide). The ion conducting separator serves to physically separate reactants at the negative electrode ("negative electrode reactants") from reactants at the positive electrode ("positive electrode reactants") and to conduct ions between the positive and negative electrodes; the ion conducting separator can be a cation conducting separator in some embodiments such as a proton exchange membrane, or a proton conducting ceramic membrane and an anion conducting separator in other embodiments, such as an anion exchange membrane, or be a porous material containing in the pores a liquid alkaline electrolyte or a liquid acidic electrolyte.

At the negative electrode of the redox flow battery, a reactant comprising carbon dioxide and its carbonaceous derivatives (e.g., formic acid or formate salts, oxalic acid or oxalate salts, carbon monoxide) is used in electrochemically catalyzed redox reactions. The redox flow battery charge cycle (i.e., energy storage) involves the electrochemical reduction of carbon dioxide at the negative electrode which operates as a cathode and produces a carbonaceous species. During the battery discharge cycle (i.e., energy generation), the carbonaceous species is oxidized on the same negative electrode surface, which now operates as the battery anode and produces carbon dioxide. In some embodiments, the negative electrode is selected from a category of high-surface porous electrodes known to those skilled in the art such as gas-diffusion electrode, catalyst coated membrane, and trickle-bed electrode. In some embodiments, the carbon dioxide is delivered to the negative electrode as either a continuous gaseous flow or as a dispersion of two-phase gas-liquid electrolyte flow (hereinafter referred to as "carbon dioxide containing reactant stream").

The redox flow battery is expected to provide an efficient energy storage device that can help address the challenges of large scale adoption of certain clean energy technologies, particularly those technologies that have an intermittent energy generation cycle (peak vs. off-peak). Unlike prior art redox flow batteries, the redox flow battery according to the present embodiments utilizes carbon dioxide and its carbonaceous derivatives as a reactant at the negative electrode. Also not taught in the prior art, the redox flow battery according to the present embodiments utilizes a reversible redox reaction involving carbon dioxide and its carbonaceous derivatives on the same electrode surface in the same device; this is an essential feature for the operation of the redox flow battery in charge and discharge modes, respectively.

A variety of carbonaceous derivatives could be generated by the electrochemical reduction of carbon dioxide including: carbon monoxide, hydrocarbons (e.g., methane, ethane, ethylene), alcohols (e.g., methanol), and organic acids and their salts (e.g., formic acid and formate salts, oxalic acid and oxalate salts). The carbonaceous derivatives generated are mainly a function of the cathode catalyst utilized and other conditions such as electrode potential, temperature, pressure and electrolyte composition. For example, experiments with reduction of carbon dioxide on indium, tin, lead, cadmium and nitrogen-doped carbon nanotubes, has been found to produce formate or formic acid depending on the pH conditions; experiments using silver, gold and zinc materials has been found to produce carbon monoxide, and experiments using copper has been found to mainly produce hydrocarbons. Accordingly, different embodiments of the redox flow battery can use different catalyst materials to produce different carbonaceous derivatives of carbon dioxide, including formic acid, oxalic acid, carbon monoxide and hydrocarbons.

Figure 1A:
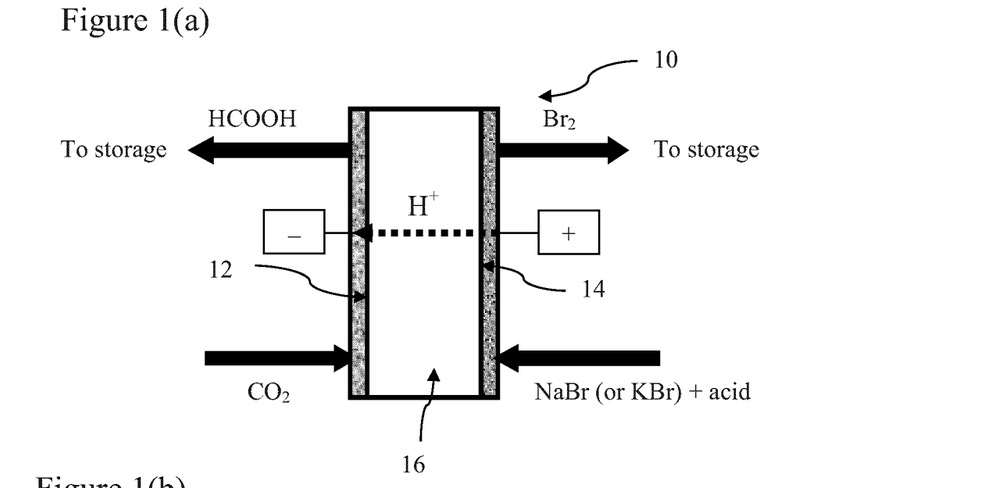
FIGS. 1(a) and (b) are schematic illustrations of a $CO_2$-formic acid redox flow battery according to a first embodiment, wherein the redox flow battery is shown operating in a battery charge mode in FIG. 1(a) and is shown operating in a battery discharge mode in FIG. 1(b).
Figure 1B:
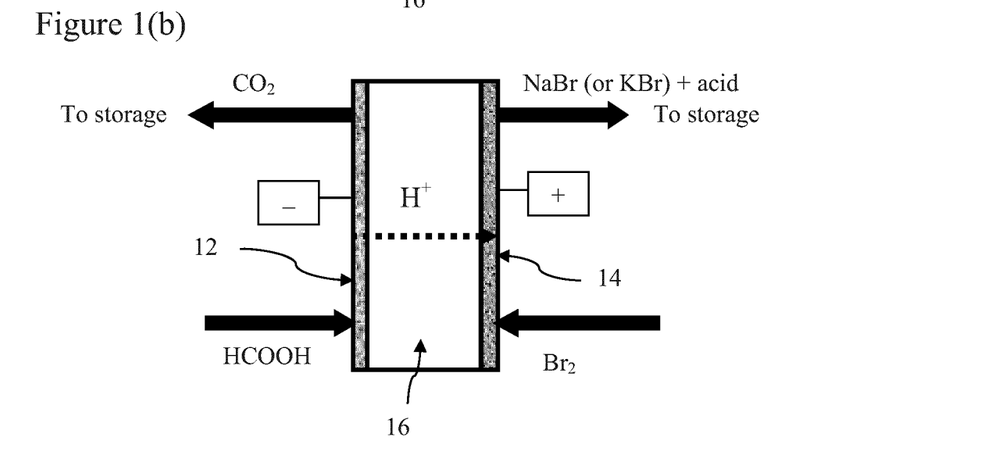
Figures 2A, 2B:
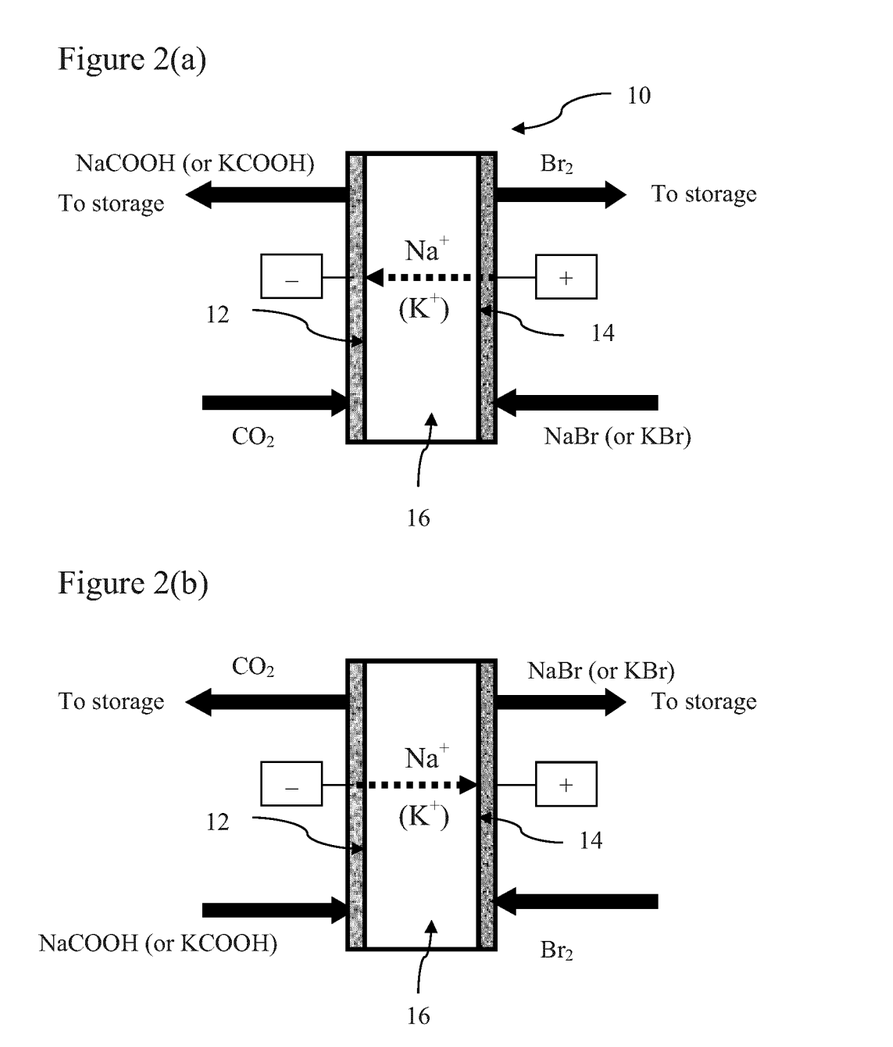

Now referring to FIGS. 1(a) and (b) and according to a first embodiment, a $CO_2$-formic acid redox flow battery 10 comprises a negative electrode 12 with a $CO_2$-formic acid redox couple and a $CO_2$-formic acid bi-functional catalyst layer, a positive electrode 14 having a bromide-bromine bi-functional catalyst layer, and an ion conducting separator 16 in between the negative and positive electrodes 12, 14 that conducts protons (herein referred to as "proton conducting separator" 16). Referring to FIGS. 2(a) and (b) and according to a second embodiment, a $CO_2$-formate redox flow battery 10 is provided which has a negative electrode 12 comprising a $CO_2$-formate salt redox couple and a $CO_2$-formate salt (sodium or potassium formate) bi-functional catalyst layer, a cation conducting separator 16 and a positive electrode 14 with a bromide-bromine bi-functional catalyst layer.

Figure 3:
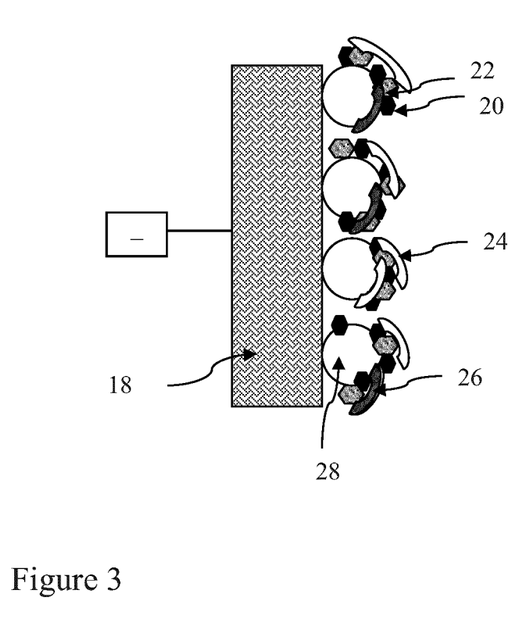
FIG. 3 is a schematic illustration of a negative electrode of the redox flow battery shown in FIG. 1 comprising a bi-functional catalyst layer on a current collector/feeder substrate.

Referring to FIG. 3, the negative electrode 12 comprises a current collector/feeder substrate 18 on which the bi-functional catalyst layer is mounted. The bi-functional catalyst layer in both the first and second embodiments comprises $CO_2$ reduction catalyst sites 20, formic acid (or formate) oxidation catalyst sites 22, an ionomer 24, and a hydrophobic agent 26 all applied to a catalyst support 28. The $CO_2$ reduction catalyst sites 20 and the formic acid (or formate) oxidation catalyst sites 22 may or may not be part of the same bulk material, depending on the catalyst design. The negative electrode 12 can be of a type selected from a group of high-surface porous electrodes known to those skilled in the art, such as gas-diffusion electrode, catalyst coated membrane, trickle-bed electrode or metal organic framework (MOF) based electrode. The negative electrode 12 structure provides bi-functional electrocatalytic activity thereby facilitating the efficient reduction of carbon dioxide and the oxidation of formic acid (or formate) on the same electrode. The $CO_2$ reduction catalyst sites 20 are most active for carbon dioxide reduction and the formic acid (or formate) oxidation catalyst sites 22 are most active for formic acid (or formate anion) oxidation. The bi-functional catalyst at the reduction and oxidation catalyst sites 20, 22 can be different crystallographic facets of the same material, morphologically different sites (e.g., edge sites vs. terraces), and binary, ternary or quaternary combination of metals and/or oxides. Examples of catalysts with bi-functional activity include but are not limited to: palladium, palladium alloys, osmium, osmium alloys, palladium-tin, palladium-tin-indium, palladium-lead-tin, palladium-lead-tin-indium, palladium-tin-osmium, palladium-osmium. Other catalysts with bi-functional activity as known to one skilled in the art can also be used.

The current collector/feeder substrate 18 can comprise a high-surface area substrate such as various carbon cloth, felt and fiber materials, organic polymer network, metal mesh (e.g., nickel, steel, copper, titanium) and metal organic framework acting also as current collector or feeder, depending whether the battery is discharged or charged, respectively. The ionomer 24 provides the ion conductive network necessary to sustain the electrochemical reactions and can be composed of proton or hydroxide ion conductive polymer or ion conductive ceramic material or liquid electrolyte. Optionally, the negative electrode catalyst layer may also contain a hydrophobic agent 26 (e.g., polytetrafluoroethylene, depicted in FIG. 3). The catalyst support 28 can be composed of carbon particles, carbon nanotubes, graphene, metal oxides (e.g., iridium oxide, zirconium oxide, titanium oxide), and/or metal particles (e.g., nickel, platinum, gold) and/or a combination of all or some of the above. The interaction effects among all these components can have a significant impact on the performance of the redox flow battery and its operational energy efficiency. For example, those skilled in the art will recognize that the catalyst support can have a strong influence on the electrocatalytic properties due to various effects such as electronic interaction effects and surface diffusion effects of key intermediates.

Referring back to the first embodiment, the proton conducting separator 16 comprises a proton exchange membrane such as a solid polymer electrolyte membrane or a proton conducting ceramic membrane. Proton conducting membranes that are suitable as the proton conducting separator 16 typically have maximum operating temperatures up to about 140° C., depending mostly on the membrane type and its ionic conductivity. Proton conducting ceramic membranes suitable for use as the proton conducting separator 16 can have maximum operating temperatures as high as 600 to 700° C. One advantage of higher maximum operating temperatures is that the kinetics of the electrode processes are much faster, therefore, the electrode kinetic-related losses are reduced. This can be advantageous for the negative carbon dioxide electrode which can suffer from sluggish kinetics in either the charge mode (i.e., carbon dioxide reduction) or discharge mode (i.e., formic acid oxidation). Mitigating the electrode kinetic losses is one way of increasing the round-trip efficiency of the redox flow battery 10.

The positive electrode 14 provides a bromide-bromine redox couple that interacts with a bi-functional (i.e., bromide oxidation and bromine reduction) catalyst layer. This catalyst layer can be high-surface area carbon (e.g., graphite felt, carbon paper) and it could contain also metals as catalyst such as platinum, palladium, gold.

This redox flow battery 10 is operable in a battery charge mode as shown in FIG. 1(*a*) and a battery discharge mode as shown in FIG. 1(*b*). In the battery charge mode, a carbon dioxide containing gaseous stream ("reduction reaction feed stream") is supplied from a $CO_2$ source (not shown) to the negative electrode 12 wherein it is reduced to formic acid under acidic pH conditions in the first embodiment (FIG. 1(*a*)). The acid pH conditions can be accomplished by using a liquid acid electrolyte and/or by incorporating an acidic ionomer (e.g., Nafion®) in the negative electrode catalyst layer. The formic acid is then flowed ("reduction reaction product stream") to a formic acid storage site (not shown). In the battery discharge mode (i.e., energy generation), formic acid from a formic acid containing stream is supplied from the formic acid storage site to the negative electrode 12 ("oxidation reaction feed stream") and is oxidized at the negative electrode 12 to produce a $CO_2$ stream. The $CO_2$ stream ("oxidation reaction product stream") is then flowed to a $CO_2$ storage site. $CO_2$ can be stored for example as compressed $CO_2$ or adsorbed on diverse high-surface area adsorbents such as zeolites, metal-organic frameworks, so it can be re-used in the battery charge mode. Thus, the $CO_2$ based redox couple is shuttled between reduction and oxidation stages. Referring to the battery charge mode depicted in FIG. 1(*a*), an alkali/alkaline earth metal-bromide salt (e.g., NaBr, KBr) or hydrobromic acid (HBr) containing stream ("oxidation reaction feed stream") is supplied from a storage site (not shown) to the positive electrode 14, and bromide anions contained therein are oxidized at the positive electrode 14 to produce a bromine stream. The bromine stream ("oxidation reaction product stream") is then flowed to a bromine storage site (not shown). Referring to the battery discharge mode (i.e., energy generation) as depicted in FIG. 1(*b*), a bromine containing stream ("reduction reaction feed stream") is supplied from the bromine storage site to the positive electrode 14, and bromine contained therein is reduced at the positive electrode 14 to produce bromide anions in an alkali/alkaline earth metal-bromide salt containing stream ("reduction reaction product stream"). Thus, at the positive electrode 14, a bromide-bromine redox couple is shuttled between the oxidation and reduction stages. The bromine can be conveniently maintained in solution forming a complex ($Br_3^-$) with bromide, in a manner as is known in the art.

The electrochemical reactions under acidic conditions associated with the first embodiment of the redox flow battery 10 and the respective standard electrode and cell potentials at 298 K are as follows:

$$(-)\ CO_2+2e^-+2H^+ \Leftrightarrow HCOOH\ E°_{298K,(-)}=-0.20\ V_{SHE}$$

$$(+)\ Br_2+2e^- \Leftrightarrow 2Br^-\ E°_{298K,(+)}=1.09\ V_{SHE}$$

$$Cell:\ Br_2+HCOOH \Leftrightarrow CO_2+2H^++2Br^-$$
$$\Delta E°_{298K}=E°_{298K,(+)}-E°_{298K,(-)}=1.29\ V$$

The theoretical specific energy density of the carbon dioxide/formic acid-bromide/bromine redox flow battery described by the equations above, is 547 Wh per kg of reactants (bromine and formic acid) at 298 K. The equilibrium (or reversible) cell potential is determined by the concentration of HCOOH, H$^+$, Br$^-$ and Br$_2$, by the partial pressure of CO$_2$ and temperature according to the Nernst equation. The practical relevance of the equilibrium potential is that it approaches the open circuit cell voltage of the battery. Therefore, during energy generation (i.e., battery discharge) the actual (operating) cell voltage will be always smaller than the open circuit voltage, whereas during battery energy storage (i.e., battery charge) in absolute value the operating cell voltage will always be higher than the open circuit cell voltage.

The round-trip operational energy efficiency of the redox flow battery 10 is defined as the electric energy (or power) generated during discharge divided by the electric energy (or power) consumed for charging. The round-trip energy efficiency depends on a multitude of factors including the negative and positive electrode charge transfer and mass transfer overpotentials and the ohmic voltage drop in the battery.

The closer to reversibility the cell reaction, the higher is the round-trip efficiency. This is largely determined by the bi-functional negative electrode catalyst (e.g., carbon dioxide reduction and formic acid (or formate anion) oxidation), as the rates of the electrochemical reactions on the negative electrode, in either the charge or discharge steps, are significantly more sluggish than the positive electrode kinetics (e.g., for the Br$_2$/Br$^-$ redox couple). In addition, the engineering optimization of other variables such as temperature, pressure, fluid dynamics, current density distribution and cell design can have a significant effect on the battery round-trip energy efficiency.

The redox flow battery 10 according to the second embodiment operates in a similar manner to the first embodiment. The primary difference is that in the battery charge mode as shown in FIG. 2(a), a carbon dioxide containing gaseous stream is supplied to the negative electrode 12 and is reduced to formate anion under alkaline pH conditions. The alkaline pH conditions can be assured by a liquid alkaline electrolyte such as bicarbonate and carbonate solutions, hydroxide solutions and/or by anionic ionomer incorporated in the negative electrode catalyst layer. In the battery discharge mode (i.e., energy generation) as shown in FIG. 2(b), the formate anion is oxidized at the negative electrode 12 to carbon dioxide.

In both embodiments, the carbon dioxide containing stream supplied to the battery can be obtained from various industrial sources including cement and steel manufacturing, fossil fuel power plants, ammonia plants, etc. The carbon dioxide containing stream can be supplied to the redox flow battery 10 either as a single-phase gaseous flow or as a two-phase liquid-gas flow (e.g., acid electrolyte solution/gas or alkaline electrolyte solution/gas). The choice of single or two-phase feed depends also on the negative electrode design of the battery. For example, if a catalyst coated membrane or gas diffusion electrode is used then single-phase gaseous CO$_2$ flow is possible. However, if a trickle bed negative electrode is employed then the two-phase feed mode with liquid electrolyte and CO$_2$ gas phases, becomes necessary. The carbon dioxide containing stream can be purified before feeding to the redox flow battery, if the other chemical components present in the stream could deactivate over time the catalytic activity of the negative electrode or contaminate other components of the battery. Energy for battery charging can be supplied from a variety of sources including conventional and alternative clean energy (e.g., solar, wind, geothermal, biogas) sources. Thus, in effect, the generated formic acid (or formate salt) can be used as energy storage media for load-leveling (e.g., for off-peak storage of solar or wind or other alternative energy sources with intermittent production). Thus, the redox flow battery has the potential to function as a carbon neutral energy storage and generation unit.

Figure 4A:
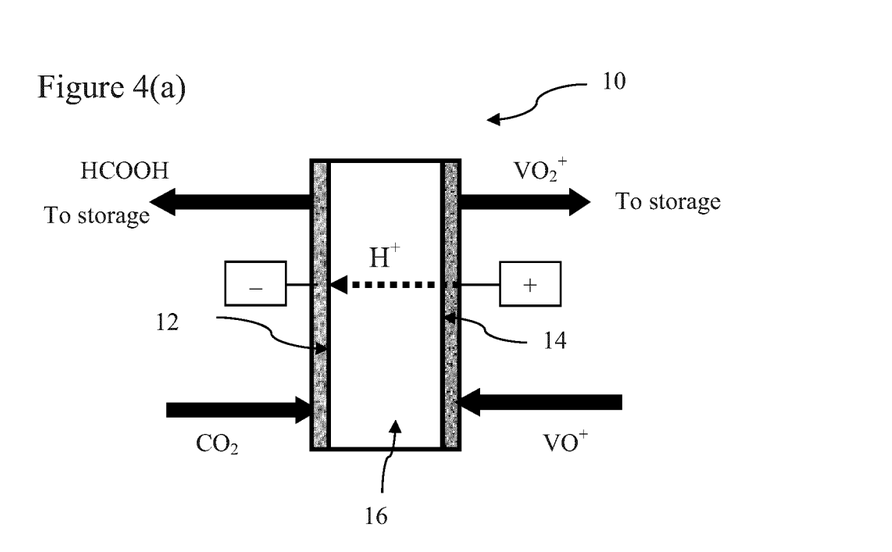
FIGS. 4(a) and (b) are schematic illustrations of a $CO_2$-formic acid redox flow battery according to a third embodiment and comprises a positive electrode with a vanadium (IV)-vanadium (V) redox couple, wherein the redox flow battery is shown operating in a battery charge mode in FIG. 4(a) and is shown operating in a battery discharge mode in FIG. 4(b).
Figure 4B:
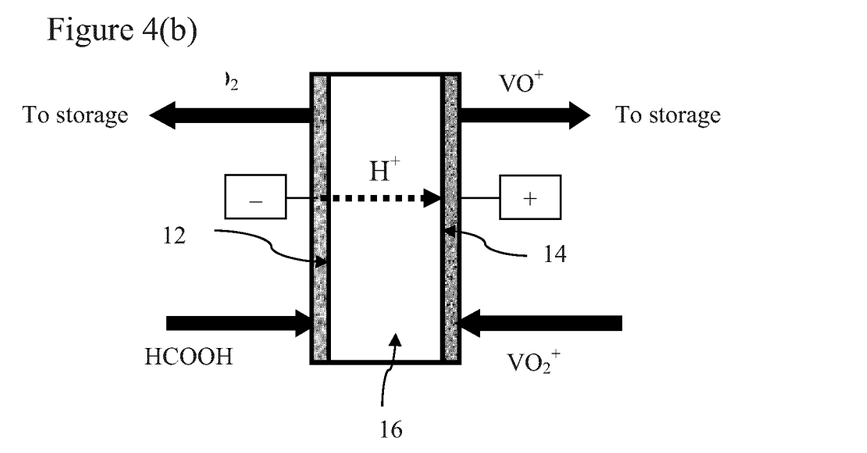

According to a third embodiment and referring to FIGS. 4(a) and (b), a redox flow battery 10 comprises the carbon dioxide-formic acid negative electrode as previously described and a vanadium (IV)/(V) positive electrode. The standard cell potential at 298 K in this case is 1.2 V. The reactions at the electrodes and the overall redox flow battery 10 are:

$$(-)\ CO_2+2e^-+2H^+ \Leftrightarrow HCOOH\ E°_{298K,(-)}=-0.20\ V_{SHE}$$

$$(+)\ VO_2^++2H^++e^- \Leftrightarrow VO^{2+}+H_2O\ E°_{298K,(+)}=1.0\ V_{SHE}$$

$$Cell:\ 2VO_2^++2H^++HCOOH \Leftrightarrow CO_2+2VO^{2+}+2H_2O$$

$$\Delta E°_{298K}=E°_{298K,(+)}-E°_{298K,(-)}=1.20\ V$$

Other embodiments of the redox flow battery 10 can utilize different redox couples than CO$_2$-formic acid and CO$_2$-formate; for example, the negative electrode 12 can include a CO$_2$-oxalic redox couple. Below, the electrode reactions of a redox flow battery 10 with a carbon dioxide oxalic acid redox couple negative electrode 12 and a bromine-bromide positive electrode 14 are presented:

$$(-)\ 2CO_2+2e^-+2H^+ \Leftrightarrow H_2C_2O_4\ E°_{298K,(-)}=-0.48\ V_{SHE}$$

$$(+)\ Br_2+2e^- \Leftrightarrow 2Br^-\ E°_{298K,(+)}=1.09\ V_{SHE}$$

$$Cell:\ Br_2+H_2C_2O_4 \Leftrightarrow CO_2+2H^++2Br^-$$
$$\Delta E°_{298K}=E°_{298K,(+)}-E°_{298K,(-)}=1.57\ V$$

In other embodiments of the redox flow battery 10, other redox couples could be used as the reactant at the positive electrode, such as: chlorine-chloride with a cell standard potential of 1.56 V, iodine-iodide, dichromate (VI)-chromium (III) with a standard cell potential of 1.56 V, cerium (IV)-cerium (III) with standard cell potential of 1.9 V, or the bi-functional oxygen electrode (oxygen reduction-oxygen evolution) with a standard cell potential of 1.49 V.

Figure 5A:
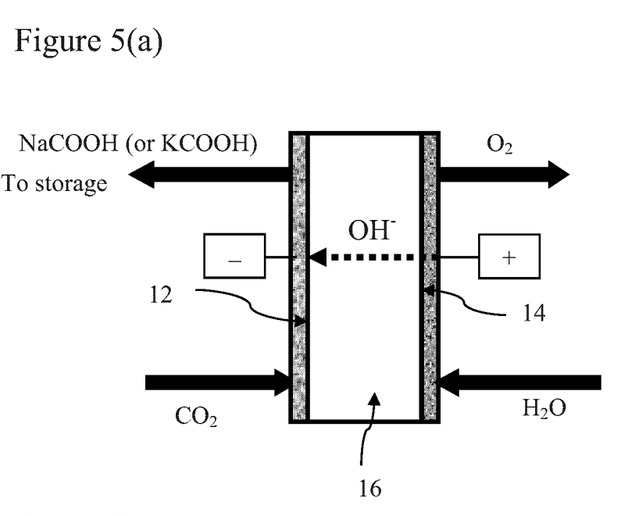
FIGS. 5(a) and (b) are schematic illustrations of a $CO_2$-formate redox flow battery according to a fourth embodiment and comprises a bi-functional oxygen electrode at a positive electrode, wherein the redox flow battery is shown operating in a battery charge mode in FIG. 5(a), and is shown operating in a battery discharge mode in FIG. 5(b).
Figure 5B:
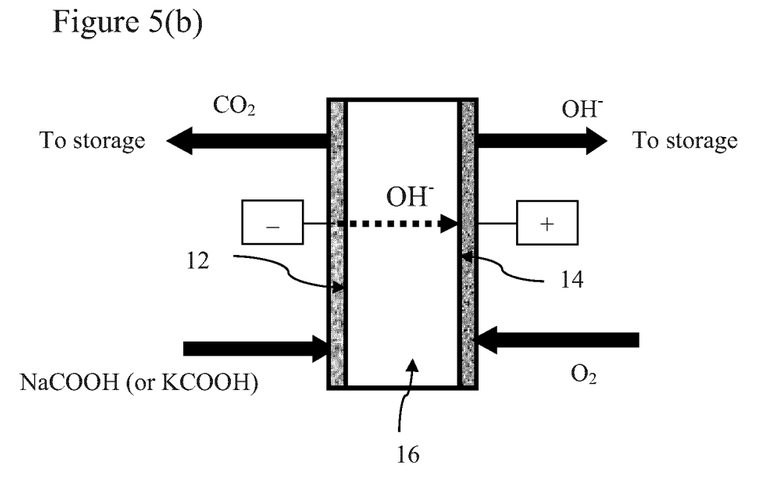

According to an alternative embodiment ("fourth embodiment") and referring to FIGS. 5(a) and (b), a redox flow battery 10 (alternatively referred to as a "rechargeable fuel cell") comprises a bi-functional oxygen electrode 14 as the positive electrode and can be operated in either acidic or alkaline media. Instead of the carbon dioxide-formic acid (or formate salt) redox couple used in the first and second embodiments, the fourth embodiment of the redox flow battery comprises a negative electrode 12 that is provided with a carbon dioxide-oxalic acid redox couple or with a carbon dioxide-oxalate salt redox couple depending on the choice of the bifunctional catalyst material. In acid media oxalic acid is produced, whereas in alkaline media oxalate salts are produced. The oxalate salt can be any one of lithium oxalate, sodium oxalate, potassium, oxalate, and cesium oxalate. An anion exchange membrane 16 may be used to separate the negative and positive electrodes 12, 14 and to minimize formate crossover from the negative to the positive electrode 12, 14. FIG. 5(a), (b) show the redox flow battery 10 operated under alkaline conditions with the bi-functional oxygen electrode 14, wherein water is oxidized to oxygen and in the energy storage mode as shown in FIG. 5(a), and oxygen (e.g. in an air stream) is reduced to hydroxide in the energy generation mode as shown in FIG. 5(b). The bi-functional oxygen electrode catalyst can be selected from a large variety of materials presented in the literature and known to those skilled in the art such as: platinum, silver, nickel, manganese dioxide, perovskites, iridium oxide, ruthenium oxides, organometallic compounds, etc.

As noted above, the embodiments of the redox flow battery 10 can be used to provide load leveling in electricity grids that contain intermittent power generation sources. Other applications of the redox flow battery 10 may also be available. For example, the redox flow battery 10 may be used for energy storage and generation on a Mars space mission. The Mars atmosphere contains about 95% carbon dioxide by volume. Therefore, the redox flow battery 10 could be employed for energy storage and generation utilizing carbon dioxide from Mars and using solar energy for the battery charge cycle.

EXAMPLES

1. Preparation of Pd—Sn Bifunctional Catalyst Layers Acting as Negative Electrodes for $CO_2$ Redox Flow Batteries by Mechanical Deposition on a Substrate Catalyst layer precursor inks composed of carbon-supported Pd nanoparticles (i.e., Pd/C), carbon-supported Sn nanoparticles (i.e., Sn/C), ionomer (e.g., Nafion®, DuPont Inc.), isopropanol, water and polytetrafluoroethylene (PTFE) are prepared by mixing and sonication at room temperature. The Nafion® and PTFE are provided as a 5% wt solution in lower alcohols and 30% wt aqueous suspension, respectively. The role of isopropanol in the ink formulation is to assure a homogeneous dispersion of the components in the suspension. The addition of PTFE imparts a partial hydrophobic property to the catalyst layer which is necessary for efficient $CO_2$ gas adsorption on the catalyst surface. Nafion® in the catalyst layer acts both as a binder and solid polymer electrolyte supplying the ion conductive network necessary to enable both the $CO_2$ reduction and formic acid oxidation reactions in cases when a liquid electrolyte is not employed in the battery negative electrode.

Next, the ink suspension is applied on a substrate by a mechanical method of choice such as spraying or painting or decal transfer. The choice of substrate for catalyst deposition is diverse and it can include a proton exchange polymer membrane (such as Nafion® 117 by DuPont), a proton conducting ceramic membrane, anion exchange membrane, carbon fiber papers (teflonated or not), graphite felt, metal meshes (e.g., Ni, Ti, Cu etc.). To enhance the catalyst adhesion, the substrate can undergo a pre-treatment step before ink spraying. The pre-treatment can include chemical and/or electrochemical cleaning steps well-known to those skilled in the art. An example of pre-treatment involves washing of the graphite felt in 1 M nitric acid for 1 hour at 90° C. After ink application, the substrate with the catalyst ink deposited on it is cured by thermal treatment to enhance the adhesion of the catalyst. In the case when the substrate is a membrane (either polymer or ceramic) the resulting catalyst layer configuration is referred to as a catalyst coated membrane. The final composition of the catalyst layer can vary as a function of the preparation method. A typical composition for a catalyst coated polymer membrane could be as follows: 15% wt ionomer (e.g., Nafion), 15% wt PTFE, and 70% wt total of Pd/C and Sn/C. It is understood that the composition of the catalyst layer is not limited in any way to the above indicated numbers.

2. Assembly and Operation of the $CO_2$ Redox Flow Rechargeable Battery with Pd—Sn Catalyst Coated Polymer Membrane as the Negative Electrode and $Br_2/Br^-$ Positive Electrode In order to construct the complete negative gas diffusion electrode of the battery, the proton exchange polymer membrane (such as Nafion® 117 or Gore Primea Series 5510) coated on one side with the Pd—Sn catalyst layer (CL) deposited as described in Example 1, is brought into contact with the teflonated carbon fiber gas-diffusion layer (GDL). Many types of GDLs are available to those skilled in the art. In this example the Sigracet 25BC is described which is coated on one side with a micro-porous layer (MPL) composed of carbon particles such as Sigracet 25BC. Teflonation of the GDL and the presence of MPL are necessary to improve the $CO_2$ gas mass transfer to the reaction sites. The MPL is interfaced between the Pd—Sn catalyst and gas diffusion layers, respectively.

For the positive electrode, the uncoated side of the same proton exchange membrane is contacted with a pre-treated graphite felt. The role of the pre-treatment step is to render the graphite fibers hydrophilic for better contact and interaction with the bromide electrolyte. A pre-treatment step that is applicable involves boiling the graphite felt in 1 M NaOH for 1 h, followed by repeated washing until the pH of the wash solution becomes neutral followed by drying. In order to construct a single-cell battery, the negative and positive electrodes sandwiching the proton exchange membrane are compressed between two gasketed current collector end plates. Typical cell compression pressures are between 15 and 120 psi. Different current collector end plate designs are known to those skilled in the art and can be selected for this application. The typical material of construction for the end plates is stainless steel.

Once assembled, the single-cell redox battery is inserted into and connected with the entire process flow setup that includes pressure and temperature controllers, pumps for electrolyte supply, tank and compressor and humidifier for $CO_2$ gas, gas/liquid condenser and tanks for formic acid (or formate salt solution) storage and bromine/bromide solution storage, respectively. For charging, the battery can be connected to a clean energy source such as solar, wind, geothermal, tidal, etc. However, strictly for experimental studies, the battery is connected to a computer controlled potentiostat for programmed charge discharge cycles. For the initial battery charging, a 4 M NaBr solution is used to feed the positive electrode, whereas a $CO_2$ stream is supplied to the negative electrode. During charging the bromide solution is continuously recirculated and the $Br_2$ concentration is continuously increased in it. Most of the $Br_2$ is dissolved in the bromide solution, forming polybromide, thus the leaking of $Br_2$ gas is virtually eliminated. On the negative electrode, the formic acid produced is continuously accumulated in the storage tank whereas the unconsumed $CO_2$ is separated from the formic acid stream and is recycled in the battery joining the fresh $CO_2$ feed.

During battery discharge, the reactions are reversed. The $Br_2$-containing solution is pumped to the positive electrode, whereas the formic acid solution is pumped to the negative electrode. Electric energy is generated by the oxidation of formic acid and reduction of $Br_2$. Again a close electrolyte recycle loop is carried out on the positive electrode, where now the concentration of bromide is gradually increasing on the expense of the decreasing $Br_2$ concentration. On the negative electrode formic acid is consumed generating $CO_2$ which can be also collected, stored and recycled in the battery.

3. Electroless Deposition of Pd—Sn Bifunctional Catalyst on Graphite Felt and Redox Flow Battery Operation with Two-Phase $CO_2$ Gas/Liquid Flow The Pd—Sn catalyst is prepared by electroless deposition on a variety of substrates such as membrane (polymer or ceramic), carbon fiber papers, graphite felt, metal meshes. Consider for example graphite felt substrate. First the graphite felt is pre-treated in 5 wt % $HNO_3$ for 15 minutes at 60° C. Afterwards, the graphite felt is immersed in a 0.1 M $PdCl_2$ and 0.4 M $SnCl_2$ solution dissolved in 4 M HCl at a temperature of 70° C. for 15 minutes. The next step is immersing the substrate in a reductant solution containing 2 M oxalic acid, 1 M HCl and $2\times10^{-3}$ M thiourea at 70° C. for 30 minutes. The last two steps, namely, immersion in the $PdCl_2$—$SnCl_2$ solution followed by immersion in the reductant solution are repeated sequentially a number of times such that to reach desirable levels of Pd and Sn loadings on the graphite felt in the range between 0.5 to 20 mg $cm^{-2}$ each. After post-deposition washing and cleaning, the Pd—Sn deposited graphite felt produced by electroless deposition is assembled in the battery together with a proton (or cation) exchange membrane and a separate graphite felt acting as the positive electrode for $Br_2/Br^-$ redox couple. The set-up for battery operation is similar to that described in Example 2, with the exception that in this case the negative electrode is fed with a two-phase flow of $CO_2$ gas dispersed in an aqueous acidic or alkaline electrolyte. Since the two-phase gas/liquid dispersion flows through the porous graphite felt negative electrode, it is referred to as a flow-through electrode configuration. Liquid electrolyte examples include but are not limited to: sulfuric acid solution, methanesulfonic acid solution, ionic liquid, sodium or potassium hydroxide solution, sodium or potassium carbonate solution.

4. Electrodeposition of Pd—Sn Bifunctional Catalyst for Battery Negative Electrode Preparation The Pd—Sn catalyst layer can be electrodeposited on diverse electronically conductive substrates. Here the process is exemplified using a partially teflonated carbon fiber substrate with microporous layer deposited on one side, the Sigracet GDL 25BC produced by the SGL group. First the GDL substrate is washed in 5% wt $HNO_3$ for 5 min at 60° C. Next it is pre-treated in a Shipley-type solution composed of $6\times10^{-3}$ M $PdCl_2$, 0.3 M $SnCl_2$ and 4 M HCl at 30° C. for 48 hours. The role of this pre-treatment is to provide nucleation sites for the electrodeposition process. The next stage is the electrodeposition on Sigracet GDL using a solution composed of 25% vol. Triton X102 non-ionic surfactant and 75% vol. aqueous phase containing 0.01 M $PdCl_2$ and 0.01 M $SnCl_2$. The GDL is placed in an electrodeposition cell with one side, the one with MPL coating on it, facing a perforated platinized titanium counter electrode. A typical deposition temperature is 60° C., at a current density of 20 A $m^{-2}$ for 120 min. The targeted loading of Pd and Sn on the Sigracet GDL is anywhere between 0.5 to 20 mg $cm^{-2}$. The surfactant presence in the electrodeposition media provides wetting of the GDL and improved dispersion of the Pd—Sn catalyst. All these are beneficial for producing a high activity battery catalyst. After the electrodeposition step has been completed, the GDL is washed and cleaned thoroughly to remove traces of surfactant from the electrode.

Following the cleaning steps, the electrodeposited GDL is ready to be used in the battery set-up similar to the conditions described in Examples 2 and 3.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention is therefore not limited to the specific details, representative apparatus and methods, and illustrative examples shown and described but instead is defined by the claims.

What is claimed is:

1. A redox flow battery, comprising:
   (a) a negative electrode comprising a carbon dioxide based redox couple and a bi-functional catalyst selected to reduce carbon dioxide to a carbonaceous derivative in an energy storage cycle and to oxidize the carbonaceous derivative to carbon dioxide in an energy generation cycle, wherein the reduction of carbon dioxide and the oxidation of the carbonaceous derivative occur on a same surface of the negative electrode;
   (b) a positive electrode containing a redox couple selected such that the equilibrium battery cell voltage for the energy generation cycle is a positive value; and
   (c) an ion conducting separator positioned to conduct ions between the negative and positive electrodes and to separate a negative electrode reactant at the negative electrode from a positive electrode reactant at the positive electrode.

2. A redox flow battery as claimed in claim 1 wherein the negative electrode redox couple is carbon dioxide-formic acid and the carbonaceous derivative is formic acid.

3. A redox flow battery as claimed in claim 1 wherein the negative electrode redox couple is carbon dioxide-formate salt.

4. A redox flow battery as claimed in claim 3 wherein the carbonaceous derivative is sodium formate.

5. A redox flow battery as claimed in claim 3 wherein the carbonaceous derivative is potassium formate.

6. A redox flow battery as claimed in claim 3 wherein the carbonaceous derivative is cesium formate.

7. A redox flow battery as claimed in claim 1 wherein the negative electrode redox couple is carbon dioxide-oxalate salt.

8. A redox flow battery as claimed in claim 7 wherein the carbonaceous derivative is sodium oxalate.

9. A redox flow battery as claimed in claim 7 wherein the carbonaceous derivative is potassium oxalate.

10. A redox flow battery as claimed in claim 7 wherein the carbonaceous derivative is cesium oxalate.

11. A redox flow battery as claimed in claim 1 wherein the positive electrode comprises a bromine-bromide redox couple and a bi-functional catalyst selected to reduce bromine and oxidize bromide.

12. A redox flow battery as claimed in claim 1 wherein the positive electrode comprises a chlorine-chloride redox couple and a bi-functional catalyst selected to reduce chlorine and oxidize chloride.

13. A redox flow battery as claimed in claim 1 wherein the positive electrode comprises a iodine-iodide (polyiodide) redox couple and a bi-functional catalyst selected to reduce iodine and oxidize iodide (polyiodide).

14. A redox flow battery as claimed in claim 1 wherein the positive electrode comprises a vanadium (IV)-vanadium (V) redox couple and a bi-functional catalyst selected to reduce vanadium (V) and oxidize vanadium (IV).

15. A redox flow battery as claimed in claim 1 wherein the positive electrode comprises a chromium (III)-dichromate (VI) redox couple and a bi-functional catalyst selected to reduce dichromate (VI) and oxidize chromium (III).

16. A redox flow battery as claimed in claim 1 wherein the positive electrode comprises a cerium (III)-cerium (IV) redox couple and comprises a bi-functional catalyst selected to reduce cerium (IV) and oxidize cerium (III).

17. A redox flow battery as claimed in claim 1 wherein the positive electrode is a bi-functional oxygen electrode comprising a bi-functional catalyst selected to oxidize water or hydroxide ions and to reduce oxygen.

18. A redox flow battery as claimed in claim 1 wherein the negative electrode bi-functional catalyst is palladium or binary palladium-tin catalyst.

19. A redox flow battery as claimed in claim 1 wherein the negative electrode bi-functional catalyst is ternary palladium-tin-indium catalyst.

20. A redox flow battery as claimed in claim 1 wherein the negative electrode bi-functional catalyst is ternary palladium-lead-tin catalyst.

21. A redox flow battery as claimed in claim 1 wherein the negative electrode bi-functional catalyst is quaternary palladium-lead-tin-indium catalyst.

22. A redox flow battery as claimed in claim 1 wherein the negative electrode bi-functional catalyst is osmium or osmium-alloy catalyst.

23. A redox flow battery as claimed in claim 1 wherein the negative electrode is a gas diffusion electrode.

24. A redox flow battery as claimed in claim 1 wherein the negative electrode is a metal organic framework electrode.

25. A redox flow battery as claimed in claim 1 wherein the negative electrode is a flow-through electrode supplied with a two-phase $CO_2$ gas/liquid dispersion, where the liquid contains dissolved ions in it.

26. A redox flow battery as claimed in claim 1 wherein the negative electrode is a bi-functional catalyst-coated membrane.

27. A redox flow battery as claimed in claim 1 wherein the ion conducting separator is a proton exchange polymer membrane.

28. A redox flow battery as claimed in claim 1 wherein the ion conducting separator is proton conducting ceramic membrane.

29. A redox flow battery as claimed in claim 1 wherein the ion conducting separator is a cation exchange membrane.

30. A redox flow battery as claimed in claim 1 wherein the ion conducting separator is a cation conducting ceramic membrane.

31. A redox flow battery as claimed in claim 1 wherein the ion conducting separator is an anion exchange membrane.

32. A redox flow battery as claimed in claim 1 wherein the ion conducting separator is a porous material containing in the pores liquid alkaline electrolyte.

33. A redox flow battery as claimed in claim 1 wherein the ion conducting separator is a porous material containing in the pores liquid acidic electrolyte.

\* \* \* \* \*